Jan. 12, 1943.                C. P. DEIBEL                2,307,770
                           DRY CELL BATTERY UNIT
                           Filed Dec. 13, 1941

INVENTOR.
Cyril P. Deibel
BY
ATTORNEYS

Patented Jan. 12, 1943

2,307,770

UNITED STATES PATENT OFFICE 2,307,770

DRY CELL BATTERY UNIT

Cyril P. Deibel, Lakewood, Ohio

Application December 13, 1941, Serial No. 422,898

10 Claims. (Cl. 136—111)

This invention relates to a dry cell battery unit of the type commonly known as a "B" battery and which is made up of a plurality of dry cells arranged in stacked relation and connected in series, each cell comprising a mix cake having one or more carbon electrodes arranged therein and a flat zinc electrode disposed between each mix cake and contacting the carbon electrodes of the next adjacent cell, each cell being separately enveloped in a thin layer of Pliofilm which permits series connections between adjacent cells, the carbon electrode of each cell having liquid tight sealed engagement with the adjacent Pliofilm layer, the Pliofilm layer of each cell being folded over the zinc electrode and urged into engagement therewith by the next adjacent cell.

One of the objects of the invention is to provide a dry cell battery unit of the character described which is made up of a plurality of flat dry cells connected in series, each cell being separately enveloped within a thin layer of sealing material which seals each cell but permits excessive pressure therein to be relieved without permitting the escape of the liquid contents of the cell or the ingress of outside air.

A further object of the invention is to provide a dry cell battery unit having the above described distinguishing features and characteristics and which is well adapted for quantity production at comparatively low cost.

Figure 1:
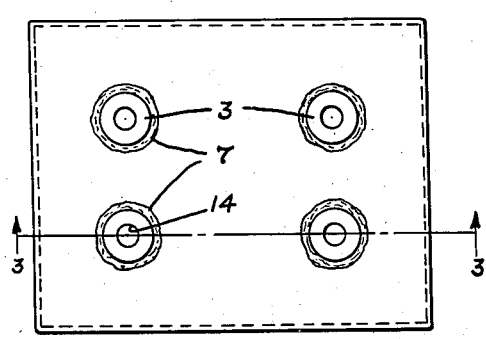
Figure 2:
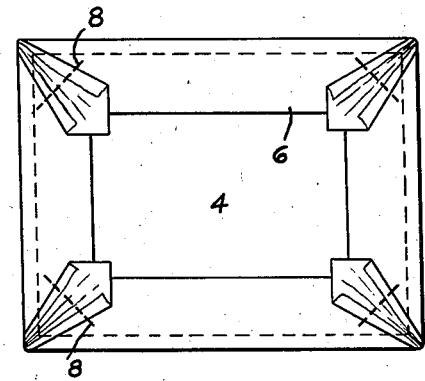
Figure 3:
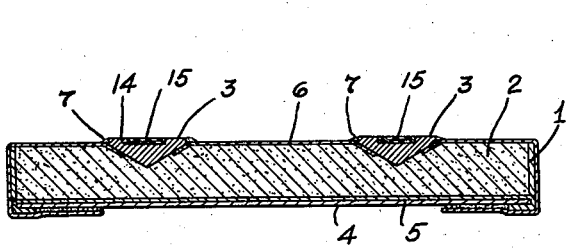
Figure 4:
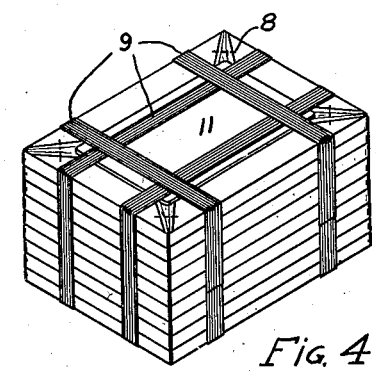
Figures 5, 6:
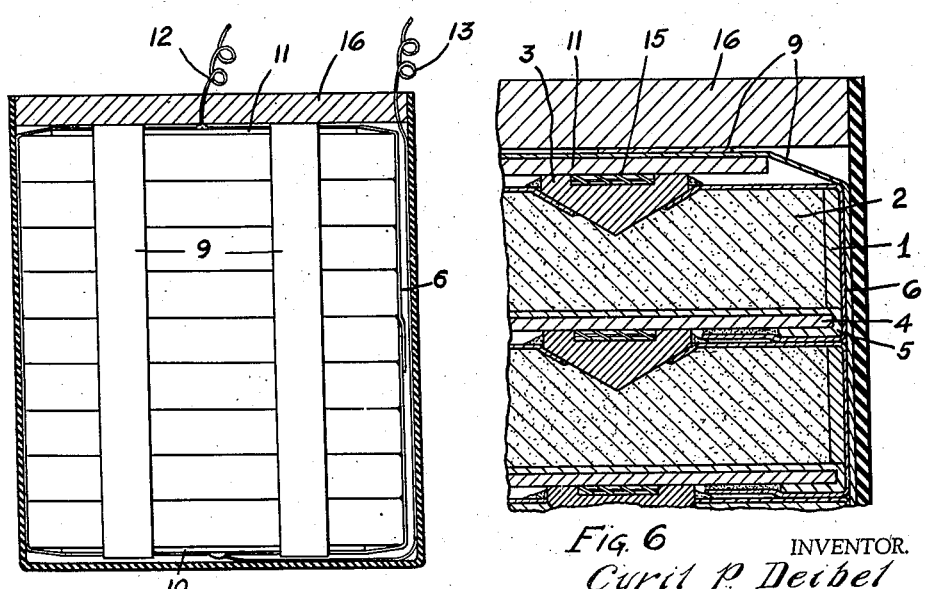

Further and more limited objects of the invention will appear as the description proceeds and by reference to the accompanying drawing in which Fig. 1 is a top plan view of one of the dry cells which forms a part of the battery unit; Fig. 2 is a bottom plan view of the cell shown in Fig. 1; Fig. 3 is a vertical sectional view on the line 3—3 of Fig. 1; Fig. 4 is a perspective view of a plurality of cells arranged in stacked relation before such cells are inserted within an outer carton; Fig. 5 is a vertical sectional view of the completed battery unit; and Fig. 6 is an enlarged fragmentary sectional view on an enlarged scale to more clearly illustrate the specific construction.

Referring now to the drawing, the reference character 1 designates a retainer or casing which may be of any desired shape and which may be formed of cardboard, fish paper or the like. A mass of depolarizing mix 2 is compressed within the retainer 1 and is provided with a plurality of recesses which receive carbon electrodes 3 therein. Disposed over the bottom of each mix cake is a zinc electrode 4 which substantially covers the bottom of the mass of mix and is insulated from the mix cake by a layer of battery paper 5, the ends of which are folded over as illustrated in Fig. 3. Enveloping each cell is a layer of Pliofilm 6 which has openings therein which receive therethrough the carbon buttons 3, which are secured in liquid tight sealed engagement with the layer of Pliofilm by a suitable adhesive 7. Each layer of Pliofilm is folded over the bottom of the zinc electrode, as will appear most clearly from Fig. 2, the corners thereof being folded over and fused together along the dot-and-dash lines indicated at 8 by means of a hot roller. If desired, a thin layer of adhesive may be first applied to the upper surface of the zinc electrode which receives thereover the peripheral edge of the Pliofilm layer. Such adhesive material preferably consists of a cold flow asphalt which is known to the trade as BRT and which has the quality of permitting excessive pressure to be relieved therethrough without permitting the ingress of outside air.

A plurality of such cells are arranged one upon another in stacked relation and secured together under pressure by means of adhesive tapes 9. Disposed at the bottom of each stack of cells is a terneplate disk 10 and disposed at the top of the stack of cells is a terneplate disk 11. A lead or connection 12 is connected with the upper terneplate and a wire or lead 13 is connected to the lowermost terneplate.

It will be noted that each carbon electrode is somewhat frusto-conical in shape and provided with a recess 14 which receives therein a spring-like member 15 which serves to provide good electrical contact between the electrodes of adjacent cells. The stack of cells arranged as described is then inserted within the outer carton formed of paper or the like and the carton is closed by means of a suitable hard seal 16. It will be noted also that the Pliofilm layer of each cell is folded over the zinc electrode and is urged into engagement therewith by the next adjacent cell, the cells being held in good electrical contact with each other by the strips of adhesive tape.

Pliofilm is hydrochlorinated rubber, that is, rubber to which hydrogen chloride has been added. Pliofilm is strong, somewhat stretchable, tear-resistant, impervious to moisture and gas and resistant to oil and hydrocarbons. Pliofilm has the quality of being sealed by fusion when heat is applied thereto. Other materials having the desirable qualities of Pliofilm of course may be used.

Excessive pressure within the cell is relieved about the overlapping peripheral edge of the Pliofilm layer without permitting the escape of the liquid contents of the cell and without permitting ingress of outside air. It will also be noted that the zinc electrode has substantially the same surface area as the next adjacent mass of mix and that one side of the zinc electrode is employed for generating current while the other side serves to make electrical contact with the carbon electrode of the adjacent cell. The Pliofilm layer is very thin, being approximately 2/1000 of an inch in thickness which permits a maximum amount of active materials to be used.

It will now be clear that I have provided a dry cell battery unit which will accomplish the objects of the invention as hereinbefore stated. It is of course to be understood that the embodiment of the invention herein disclosed is to be considered merely illustrative and not in a limiting sense as various changes may be made in the specific materials used as well as in the shape, size and arrangement of parts without departing from the spirit of the invention. The invention is therefore limited only in accordance with the scope of the appended claims.

Having thus described my invention, what I claim is:

1. A dry cell battery unit comprising a plurality of dry cells arranged in stacked relation and connected in series, each cell comprising a mix cake, a carbon electrode arranged within said mix cake, a flat zinc electrode disposed between each mix cake, a layer of Pliofilm covering one face of the mix cake and zinc electrode but permitting series connection between adjacent cells, each carbon electrode having liquid tight sealed engagement with the adjacent Pliofilm layer, the Pliofilm layer of each cell being folded over the zinc electrode and urged into engagement therewith by the next adjacent cell.

2. A dry cell battery unit comprising a plurality of dry cells arranged in stacked relation and connected in series, each cell comprising a mix cake, a carbon electrode arranged within said mix cake, a flat zinc electrode disposed between each mix cake, a layer of Pliofilm enveloping each mix cake and zinc electrode but permitting series connection between adjacent cells, each carbon electrode having liquid tight sealed engagement with the adjacent Pliofilm layer, the Pliofilm layer of each cell covering one face of the mix cake and being folded over the zinc electrode and urged into engagement therewith by the next adjacent cell, a thin layer of sealing material sealing each layer of Pliofilm to the next adjacent zinc electrode but permitting excessive pressure to be relieved without permitting the ingress of outside air.

3. A dry cell battery unit comprising a plurality of dry cells arranged in stacked relation and connected in series, each cell comprising a mix cake, a carbon electrode arranged within said mix cake, a flat zinc electrode disposed between each mix cake, a layer of Pliofilm enveloping each mix cake and zinc electrode but permitting series connection between adjacent cells, each carbon electrode having liquid tight sealed engagement with the adjacent Pliofilm layer, the Pliofilm layer of each cell covering one face of the mix cake and being folded over the zinc electrode and urged into engagement therewith by the next adjacent cell, and means holding all of said cells in intimate contact with each other under pressure.

4. A dry cell battery unit comprising a plurality of dry cells arranged in stacked relation and connected in series, each cell comprising a mix cake, a carbon electrode arranged within said mix cake, a flat zinc electrode disposed between each mix cake, a layer of Pliofilm enveloping each mix cake and zinc electrode but permitting series connection between adjacent cells, each carbon electrode having liquid tight sealed engagement with the adjacent Pliofilm layer, the Pliofilm layer of each cell covering one face of the mix cake and being folded over the zinc electrode and urged into engagement therewith by the next adjacent cell, an outer carton enclosing said stack of cells and an asphalt seal closing the upper end of said carton and having liquid tight sealed engagement with the next adjacent Pliofilm layer.

5. A dry cell battery unit comprising a plurality of dry cells arranged in stacked relation and connected in series, each cell comprising a mix cake, a carbon electrode arranged within said mix cake, a flat zinc electrode disposed between each mix cake, a layer of Pliofilm enveloping each mix cake and zinc electrode but permitting series connection between adjacent cells, each carbon electrode having liquid tight sealed engagement with the adjacent Pliofilm layer, the Pliofilm layer of each cell covering one face of the mix cake and being folded over the zinc electrode and urged into engagement therewith by the next adjacent cell, and resilient means carried by said carbon electrode and providing good electrical contact with the next adjacent zinc electrode.

6. A dry cell battery unit comprising a plurality of dry cells arranged in stacked relation and connected in series, each cell comprising a mix cake, a carbon electrode arranged within said mix cake, a flat zinc electrode disposed between each mix cake, a layer of Pliofilm enveloping each mix cake and zinc electrode but permitting series connection between adjacent cells, each carbon electrode having liquid tight sealed engagement with the adjacent Pliofilm layer, the Pliofilm layer of each cell covering one face of the mix cake and being folded over the zinc electrode and urged into engagement therewith by the next adjacent cell, an outer carton enclosing said stack of cells and an asphalt seal closing the upper end of said carton and having liquid tight sealed engagement with the next adjacent Pliofilm layer, and vent means associated with said asphalt seal permitting excessive pressure to be relieved without permitting ingress of outside air.

7. A dry cell battery unit comprising a pluraliay of dry cells arranged in stacked relation and connected in series, each cell comprising a mix cake, a carbon electrode arranged within said mix cake, a flat zinc electrode disposed between each mix cake, a layer of thin flexible waterproof, acid-proof insulating material which is impervious to air and gas enveloping each mix cake and zinc electrode but permitting series connection between adjacent cells, each carbon electrode having liquid tight sealed engagement with the adjacent layer of insulating material, the insulating layer of each cell covering one face of the mix cake and being folded over the bottom of the zinc electrode and urged into engagement therewith by the next adjacent cell.

8. A dry cell battery unit comprising a plurality of thin flat dry cells arranged in stacked relation and connected in series, each cell comprising a mix cake, a carbon electrode projecting into said mix cake, a flat zinc electrode disposed over each mix cake, a layer of thin flexible waterproof insulating material which is impervious to air and gas covering each mix cake and being folded over the zinc electrode but permitting series connection between adjacent cells, each carbon electrode having liquid tight sealed engagement with the adjacent layer of insulating material, the insulating layer of each cell covering one face of the mix cake and being folded over the bottom of the zinc electrode and urged into engagement therewith by the next adjacent cell and a thin layer of electrolyte proof sealing material disposed between said zinc electrode and the folded over portion of said insulating layer.

9. A dry cell battery unit comprising a plurality of dry cells arranged in stacked relation and electrically connected, each cell comprising a thin flat mix cake containing electrolyte, a carbon electrode and a zinc electrode, a thin layer of electrolyte-proof, slightly compressible dielectric material covering one face of each mix cake and folded over the bottom of the zinc electrode but permitting electrical connection between adjacent cells, each carbon electrode projecting through said dielectric material and having liquid tight sealed engagement therewith, said layer of dielectric material being urged into engagement with the zinc electrode by the next adjacent cell, and means holding all of said cells in intimate electrical contact.

10. A dry cell battery unit comprising a plurality of dry cells arranged in stacked relation and electrically connected, each cell comprising a thin flat mix cake containing electrolyte, a carbon electrode and a zinc electrode, a thin layer of electrolyte-proof, slightly compressible dielectric material covering one face of each mix cake and folded over the bottom of the zinc electrode but permitting electrical connection between adjacent cells, each carbon electrode projecting through said dielectric material and having liquid tight sealed engagement therewith, said layer of dielectric material being urged into engagement with the zinc electrode by the next adjacent cell, means holding all of said cells in intimate electrical contact, all of said cells being enclosed within a thin wrapping of electrolyte-proof dielectric material, an outer carton enclosing said cells and means sealing said outer carton.

CYRIL P. DEIBEL.